United States Patent [19]

Striker et al.

[11] 3,855,480
[45] Dec. 17, 1974

[54] FAULT-INDICATING CIRCUIT FOR A FLOW-METERING SYSTEM

[75] Inventors: György Striker; Bela Gyürüsi, both of Budapest, Hungary

[73] Assignee: Merestechnikai Kozponti Kutato Laboratorium, Budapest, Hungary

[22] Filed: Nov. 14, 1973

[21] Appl. No.: 415,805

Related U.S. Application Data

[63] Continuation-in-part of Ser. No. 251,749, May 9, 1972, abandoned.

[30] Foreign Application Priority Data

May 21, 1971  Hungary............................ ME 1362

[52] U.S. Cl............ 307/118, 307/149, 317/148.5 R
[51] Int. Cl............................................. G01f 15/00
[58] Field of Search............ 340/213 Q, 409, 239 R; 317/148.5 R; 307/118, 149

[56] References Cited
UNITED STATES PATENTS

| | | | |
|---|---|---|---|
| 3,008,131 | 11/1961 | Einsel et al. | 340/213 Q |
| 3,202,804 | 8/1965 | Schlein | 340/213 Q |
| 3,246,176 | 4/1966 | Nazareth, Jr. | 307/118 |
| 3,318,479 | 5/1967 | Houle | 340/409 |
| 3,408,940 | 11/1968 | McGrogan | 307/118 |
| 3,443,438 | 5/1969 | Martin et al. | 340/409 |
| 3,446,986 | 5/1969 | Cox | 307/118 |
| 3,618,069 | 11/1971 | Evans et al. | 340/409 |
| 3,626,370 | 12/1971 | Stubbs | 340/213 Q |

*Primary Examiner*—L. T. Hix
*Attorney, Agent, or Firm*—Michael S. Striker

[57] ABSTRACT

The flow metering system includes a unit for establishing a flow of fluid through a fluid conduit, a unit for generating an electrical flow velocity signal indicative of the velocity of fluid flow through the conduit, a unit for registering the value of the electrical flow velocity signal over a period of time in order to determine the quantity of fluid passing through the conduit during such period of time, a source of biasing voltage for the registering unit, and an arrangement for simply determining the existence or nonexistence of fluid flow in the conduit. A fault-indicating circuit includes a first transistor having a base connected to receive a voltage corresponding to the electrical flow velocity signal, and a second transistor having a base connected to the collector of the first transistor. The collectors of the two transistors receive biasing voltages corresponding to the output voltage of the source of biasing voltage for the registering unit. The circuit includes a third transistor having an emitter connected to the emitter of the first transistor, and a parallel RC circuit connected across the base-emitter junction of the third transistor. A first charging circuit branch is connected between the emitter of the second transistor and the base of the third transistor and is operative for charging the capacitor of the parallel RC circuit with current flowing through the collector-emitter path of the second transistor. A second charging circuit branch is connected to the base of the third transistor and is connected to the unit which determines the existence or non-existence of fluid flow and is operative for charging the capacitor by applying to the input of the second charging circuit branch a predetermined voltage when the unit which detects the existence or nonexistence of fluid flow in said conduit detects the existence of fluid flow in said conduit. A warning arrangement includes a fourth transistor having a base-emitter junction connected across the collector-emitter path of the third transistor and an indicating lamp connected between the collectors of the second and fourth transistors. The base of the fourth transistor is connected to the collector of the second transistor, and a relay is connected across the collector-emitter path of the fourth transistor.

3 Claims, 2 Drawing Figures

FAULT-INDICATING CIRCUIT FOR A FLOW-METERING SYSTEM

RELATED APPLICATION

The present application is a continuation in-part application of our application, now abandoned, Serial No. 251,749, filed May 9, 1972, entitled FAULT INDICATING EQUIPMENT FOR FLOW METERING SYSTEMS.

BACKGROUND OF THE INVENTION

The invention relates to problems in the metering of the flow of fluids. The function of a flow metering system is of course to accurately determine the quantity of the medium passing through a particular location during a particular interval of time. Malfunctions in such flow metering systems often lead to meter readings which are highly inaccurate or entirely incorrect. Unfortunately, however, such malfunction and the resulting incorrectness of the meter reading often go by undetected. This ever-present possibility casts a shadow of doubt upon the reliability of the meter readings at all times, even when the meter readings are in fact entirely accurate. Particularly in applications where the fluids being metered are very expensive, as in certain commercial applications, or where inaccuracy in the metering of fluids may result in dangerous situations, as in certain applications in the chemical industry, the sense of insecurity resulting with such a system is most undesirable.

Among the sources of trouble with such metering systems are the following:

1. A breakdown in the flow transducer. The flow transducer, when operating properly, generates a signal, for example an electrical signal, having a magnitude proportional to the instantaneous rate of flow of the fluid to be metered. Usually, the flow velocity signal furnished by such flow transducer is applied to the input of an integrator circuit, of the type well known in analog computers for example, which generates a signal corresponding to the time integral of the flow velocity signal and thereby corresponding to the total quantity of fluid which has passed during the time of the integration. The output display device associated with such integrator circuit, whether of the digital display or analog display variety, will accordingly give an inaccurate or altogether incorrect indication of the flow conditions.

2. A loss of mains voltage supply or a loss of biasing voltage. Usually the electronic circuitry employed in such flow metering systems is supplied with a relatively low magnitude D.C. biasing voltage, derived from a highmagnitude A.C. mains voltage by suitable transformer action, coupled with rectification and filtering. If the mains voltage is lost, or if the means for converting the mains voltage to the desired D.C. biasing voltage becomes inoperative, then the flow metering system will not work at all, or will work improperly, for instance by indicating zero flow when flow is in fact occurring.

3. An excessively low flow velocity of the medium being metered. As is well known, any electronic circuit has a certain range of response wherein the response is highly linear, and has boundary ranges wherein the response is highly non-linear and distorted. In the case of a simple amplifier, for example, the input signal must be within a certain range of magnitudes if it is to be amplified without excessive distortion; if the magnitude of the input signal applied to such amplifier is too low, then the signal will be amplified in a very distorted manner. In flow metering systems of all types, electrical, electromechanical, and purely mechanical, if the flow rate is excessively low, the integrating or other recording or registering components of the system may respond in a non-linear and distorted manner to the input stimulus, or may not respond at all.

With the above three possible sources of inaccurate and entirely incorrect meter readings in mind, it is to be noted that it is not particularly advantageous or desirable to provide means for generating a warning signal whenever the metering system indicates zero flow, by reason of the consideration that the flow may of course in many circumstances in fact be zero. Accordingly, it is desired that a warning signal, indicative of inaccurate meter reading, be generated, for example, only if the meter indicates zero flow when the flow is in fact taking place.

It is known to provide fault-indicating apparatuses, each operative for monitoring one of the operating variables or parameters mentioned above. For example, it is known to provide an apparatus for determining instantaneous flow rate, to provide a further apparatus for determining the presence or absence of flow, to provide a still further apparatus for detecting the existence of a suitable biasing voltage applied to the electronic circuitry of the integrator or recording components of the metering system, and still further to provide means for determining the magnitude of the generated flow velocity signal for the purpose of determining whether it lies within the range of accurate response of the metering system as a whole. However, the provision of all these separate components involves a substantial amount of cost, and indeed can take up a substantial amount of space. For this reason, even many of the largest industrial firms chose not to make use of such a multitude of monitoring devices.

SUMMARY OF THE INVENTION

It is accordingly the general object of the present invention to provide a flow metering system for metering of fluids provided with fault-detecting means, in the form of a single unitary circuit, adapted to perform all the necessary fault-detecting operations in the manner described above.

It is a more particular object of the invention to provide such single unitary circuit which, of itself, is hardly more complex than would be each of the plurality of separate monitoring means mentioned above.

These objects, and others which will become more understandable from the following discussion of the preferred embodiment, can be met, according to one advantageous concept of the invention, by providing a flow metering system which includes a unit for establishing a flow of fluid through a fluid conduit, a unit for generating an electrical flow velocity signal indicative of the velocity of fluid flow through the conduit, a unit for registering the value of the electrical flow velocity signal over a period of time in order to determine the quantity of fluid passing through the conduit during such period of time, a source of biasing voltage for the registering unit, and an arrangement for simply determining the existence or non-existence of fluid flow in the conduit. The arrangement further includes a fault-indicating circuit comprising a first transistor having a base connected to receive a voltage corresponding to the electrical flow velocity signal, and a second transistor having a base connected to the collector of the first transistor. The collectors of the two transistors receives biasing voltages corresponding to the output voltage of the source of biasing voltage for the registering unit. The circuit includes a third transistor having an emitter connected to the emitter of the first transistor, and a parallel RC circuit connected across the base-emitter junction of the third transistor. A first charging circuit branch is connected between the emitter of the second transistor and the base of the third transistor and is operative for charging the capacitor of the parallel RC circuit with current flowing through the collector-emitter path of the second transistor. A second charging circuit branch is connected to the base of the third transistor and is connected to the unit which determines the existence or nonexistence of fluid flow and is operative for charging the capacitor by applying to the input of the second charging circuit branch a predetermined voltage when the unit which detects the existence or non-existence of fluid flow in said conduit detects the existence of fluid flow in said conduit. A warning arrangement includes a fourth transistor having a base-emitter junction connected across the collector-emitter path of the third transistor and an indicating lamp connected between the collectors of the second and fourth transistors. The base of the fourth transistor is connected to the collector of the second transistor, and a relay is connected across the collector-emitter path of the fourth transistor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
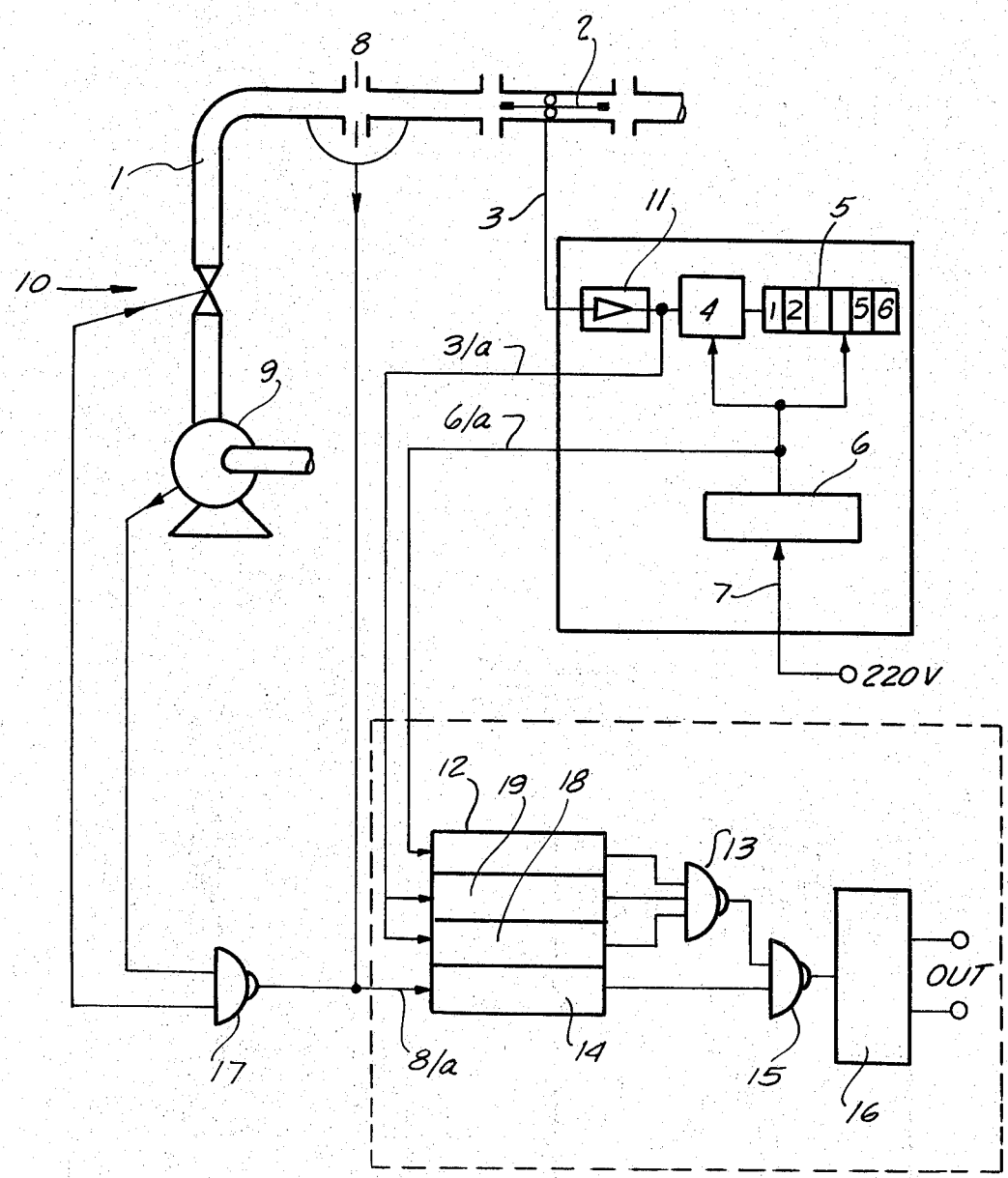
FIG. 1 illustrates a flow metering system provided with a schematically depicted fault-detecting arrangement.

A fluid medium is pumped by a pump 9 through a fluid conduit 1, in direction upwards from the pump 9 and then rightwards along the horizontal portion of the conduit 1. Positioned in the fluid conduit 1 is a rotating-member flow meter 2, of conventional design, adapted to generate an electrical signal indicative of the rate of flow of fluid through conduit 1. At its simplest, for example, flow meter 2 could comprise a simple paddle wheel coupled to the shaft of a small generator located outside the fluid conduit, so that the generator would generate a voltage indicative of the fluid flow rate. Equivalent devices of greater sophistication are known in the art, and do not per se form part of the present invention.

The fluid velocity signal generated by device 2, in the present embodiment an electrical signal, is applied to the input of an amplifier 11. The output of amplifier 11 is connected to the input of a data processor 4. Data processor 4 may, for example, be an electrical integrating circuit, such as a Miller integrator, adapted to integrate the flow velocity signal applied to its input, in order to generate at its output a signal indicative of the total quantity of fluid passing by the device 2 during the time period of integration of the flow velocity signal. Connected to the output of data processor 4 is a digital display device 5, of entirely conventional nature. The digital display device 5 is operative for converting the signal furnished at the output of data processor 4 into digital form and displaying the resulting digital value representative of the metered quantity of fluid. Analog-to-digital converters and digital display devices are very well known in this art, and do not per se form part of the present invention.

The (non-illustrated) circuitry internal to the data processor 4 and the digital display device 5 is supplied with suitable biasing voltage by means of a biasing voltage supply unit 6, the outputs of which are connected to devices 4 and 5. Biasing voltage supply unit 6 receives electrical energy from conventional electrical mains, i.e., receives electrical energy in the form of a high-magnitude A.C. voltage. Biasing voltage supply unit 6 is operative for reducing the magnitude of such input voltage, rectifying the input voltage, and then filtering the input voltage, in order to produce the desired steady-level low-magnitude biasing voltages needed by devices 4 and 5. To this end, biasing voltage supply unit 6 may for instance comprise a step-down transformer having a primary connected across the mains and having a secondary connected across the input of a full-wave or half-wave rectifier, with the output of such rectifier being connected across the input of a low-pass filter, with the output of the low-pass filter being applied to the devices 4 and 5 either directly, or else possibly indirectly, for example through suitable voltage dividers.

A flow detector device 8, of per se conventional design, is provided to determine the presence or absence of fluid flow in fluid conduit 1. A shutoff valve 10 is provided downstream of the outlet of pump 9.

Signal transmission line 3/a applies the voltage at the output of amplifier 11 to a fluid velocity evaluator 19 and furthermore to a fluid velocity signal amplitude evaluator 18. Fluid velocity evaluator 19 is operative for determining whether the fluid velocity signal applied to it is indicative of fluid flow, i.e., is indicative of non-zero fluid flow. When the fluid velocity signal applied to evaluator 19 is indicative of zero fluid flow, the evaluator 19 furnishes at its output a logic 0 signal; otherwise it furnishes a logic 1 signal.

The fluid velocity signal amplitude evaluator 18 is operative for determining whether the amplitude of the amplified fluid velocity signal generated at the output of amplifier 11 is of a value high enough as to correspond to the range of accurate response of the components 11, 4 and 5. When the detected amplitude is so low as to be below the range of signal amplitudes which devices 4 and 5 can accurately process, then evaluator 18 generates at its output a logic 0 signal; otherwise, it generates at its output a logic 1 signal.

A biasing voltage evaluator 12 has an input connected to the output of biasing voltage supply unit 6. When the biasing voltage supplied by unit 6 is of sufficient magnitude, evaluator 12 generates at its output a logic 1 signal. When the biasing voltage supplied by unit 6 is of insufficient magnitude, either because of loss of the mains voltage or because of malfunction of the unit 6, then the evaluator 12 generates at its output a logic 0 signal. The output of biasing voltage supply unit 6 is connected to the input of biasing voltage evaluator 12 by way of signal transmission line 6/*a*.

The outputs of the evaluators 12, 19 and 18 are all connected to respective ones of the three inputs of a logic circuit 13. So long as the signal at the output of amplifier 11 is substantially non-zero and furthermore within the range of accurate response for which evaluator 18 is set, and so long as the biasing voltage supplied by unit 6 is of sufficient value, the signal at the output of circuit 13 will be at logic level 1.

The fault-detecting device 12, 19, 18, 14 is further comprised of a blockage monitor 14. Blockage monitor 14 has an input connected to the flow detector device 8 which, as mentioned before, is operative for simply determining the presence or absence of fluid flow, in contrast for example to fluid velocity detector 2 which develops an electrical signal actually indicative of fluid velocity, and not the mere presence or absence of fluid flow.

Flow detector 8, which is per se conventional and does not per se form part of the invention, may be operative, for example, for generating a predetermined voltage upon detection of fluid flow and for generating a different predetermined voltage or possibly zero voltage upon detection of zero fluid flow, or vice versa. The blockage monitor 14 is operative for generating at its output a logic 1 signal when the flow detector 8 detects the presence of fluid flow.

The output of logic circuit 13 and the output of blockage monitor 14 are respectively connected to the two inputs of a logic circuit 15. In the event of trouble-free operation, the output signal of circuit 15 is at logic level 1, so that the signal at the input of warning device 16 is likewise at logic level 1. Should any of the evaluators 12, 18 or 19 indicate anything out of order, fault indicator unit 16 will emit a warning signal, indicating that accurate metering is not occurring.

Instead of using the flow detector 8, which may for example be a simple make-break switch mounted on members in the path of flow of fluid so as to make or break an electrical circuit when flowing fluid impinges upon one of such members, use can instead be made of devices connected to the pump 9 and to the shutoff valve 10. Such devices can indicate when the pump 9 is not operating and/or when the shutoff valve 10 is completely closed, whereby to give an indirect indication of the absence of fluid flow. As mentioned before, it is desired that a warning signal not be given when the fluid velocity signal indicates zero fluid flow, if in fact the fluid flow is zero. The devices which detect whether pump 9 is operating and whether valve 10 is closed can be connected to the two inputs of an AND-gate 17, in such a manner that the output of AND-gate 17 will furnish a signal indicative of zero fluid flow when either the pump 9 is not working or the shutoff valve 10 is fully closed.

The input into blocking monitor 14 can be derived solely from the flow detector 8 as explained above, or alternatively can be derived solely from the output of AND-gate 17, as just explained.

Blocking monitor 14 prevents the fault indicating unit 16 from generating a fault-indicating warning signal when, due to no malfunction of the metering system, the flow velocity of the fluid medium has dropped below a predetermined threshold value so that the meter accurately records the absence of flow.

Figure 2:
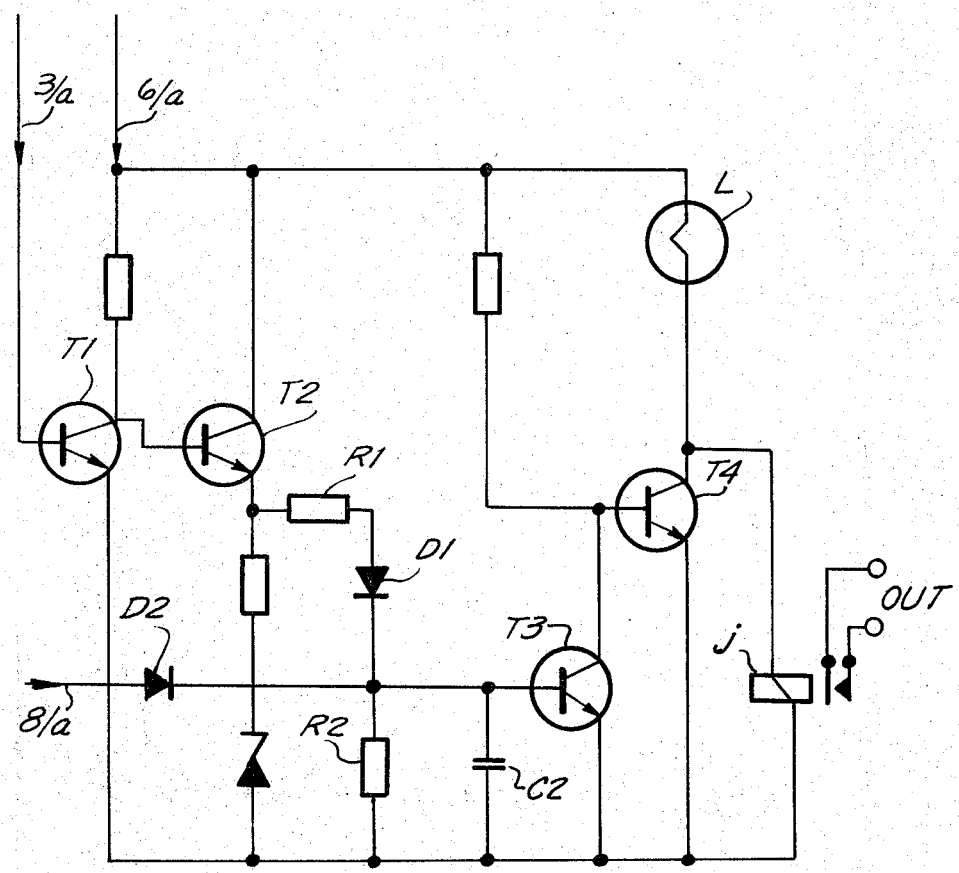
FIG. 2 illustrates the circuit diagram of the fault-detecting circuit according to the invention.

FIG. 2 depicts a circuit diagram for realizing the functions described with respect to the fault-detecting system of FIG. 1.

The warning device in the circuit of FIG. 2 is comprised of an indicating lamp L and a relay *j*, having an output designated OUT. The relay *j* may be connected to an appropriate electrical circuit for generating an electrical signal, or some other suitable warning signal, or else for performing some appropriate control function, such as terminating operation of the pump 9 or in some other manner terminating the flow of fluid through conduit 1.

The circuit of FIG. 2 is comprised of a first transistor T1 having a base connected to the signal transmission line 3/*a* and having a collector connected to a collector resistor and furthermore connected to the base of a second transistor T2. The terminal of the collector resistor of T1 not connected to the collector thereof, and also the collector of second transistor T2, are connected to the signal transmission line 6/*a*, associated with the biasing voltage supply unit 6. Connected between the emitters of transistors T1 and T2 is a circuit branch composed of a Zener diode and a resistor, not designated with reference numerals. Furthermore connected between the emitters of transistors T1 and T2 is the series connection of a charging resistor R1, a charging diode D1 and a discharging resistor R2. Connected in parallel with the discharging resistor R2 and connected to the cathode of charging diode D1 is a capacitor C2, which can be charged through charging resistor R1 and charging diode D1, and which discharges through discharging resistor R2. The parallel combination of capacitor C2 and discharging resistor R2 forms, in effect, an integrating stage, as will become clearer from the description of the circuit operation.

The capacitor C2 is connected across the base-emitter junction of a third transistor T3, the emitter of which is connected to the emitter of transistor T1. The collector of transistor T3 is connected, via a respective collector resistor, to the collector of transistor T2. The collector-emitter path of transistor T3 is connected across the base-emitter junction of a fourth transistor T4, and as will be evident to those skilled in the art, the conductivity of transistor T3 will control the conductivity of transistor T4. Connected in the collector circuit of transistor T4, between the collector of T4 and the collector of T2, is an indicating lamp L. Connected across the collector-emitter path of transistor T4 is the winding *j* of the relay mentioned above.

Finally, connected to the base of transistor T3 is the cathode of a further diode D2, the anode of which is connected to the signal-transmission line 8/*a* mentioned earlier with respect to FIG. 1.

The operation of the circuit of FIG. 2 is as follows:

The flow velocity signal appearing at the output of amplifier 11 in FIG. 1 is applied, via signal transmission line 3/*a*, to the base of transistor T1.

The bias voltage furnished by bias voltage supply unit 6 is applied to the collector of transistor T2 and to the collector resistor of T1, and this bias voltage evidently constitutes the supply voltage for the entire circuit shown in FIG. 2.

The flow detector unit 8 shown in FIG. 1 is operative for applying a positive voltage to the base of transistor T3, via diode D2, when flow detector 8 detects the flow of fluid through conduit 1. However, when flow detector 8 detects the absence of flow of fluid through conduit 1, then unit 8 applies to signal transmission line 8/a a zero-voltage signal, which serves to block transistor T3, in a manner which will be described with respect to the circuit operation, below.

It is to be noted that the flow detector 8 can be comprised of a battery or other source of voltage having two terminals, for instance. The flow detector 8 can comprise a member mounted for movement in the fluid conduit 1 when impinged upon by flowing fluid in such a manner as to engage two normally separated electrical contacts, one of which is mounted on the movable member. The electrical contacts may advantageously be connected to the battery and to the anode of diode D2, serving to apply the positive battery voltage to the anode of D2 when the existence of flow is detected. When this positive voltage is applied to the base of T3, via diode D2, the voltage will be of such a polarity as to forward-bias transistor T3 into conduction, but will have a magnitude below the forward-bias cut-in voltage of the transistor T3, so that the transistor T3 cannot become conductive exclusively as a result of the positive voltage applied to the base thereof via diode D2 from signal line 8/a.

In normal operation, the flow velocity voltage will be applied to input 3/a; the bias voltage will be applied to input 6/a; and the flow-indicating signal will be applied to input 8/a.

As a result of the bias voltage applied to input 6/a, the circuit of FIG. 2 will be biased for operation, and lamp L will normally be illuminated. If for any reason, the bias voltage furnished by bias voltage supply unit 6 is no longer applied to input 6/a, then the circuit of FIG. 2 will no longer be biased for operation, and the lamp L will become non-illuminated.

When the bias voltage is applied to input 6/a, then the application of the flow velocity voltage to the base of transistor T1 has the following effect: The transistor T1 is maintained highly conductive, so that its collector voltage is relatively low. As a result the voltage applied to the base of second transistor T2 is relatively low, and transistor T2 will be only slightly conductive, if at all. To the extent that transistor T2 conducts current, such current will flow through charging resistor R1 and charging diode D1 into capacitor C2, slightly charging the latter. However, the charge accumulated by capacitor C2 will not be able to build up to an extent sufficient to forward-bias transistor T3 to conduction, because of the leakage of charge through discharge resistor R2 and through the base-emitter path of transistor T3. Charging current will flow into capacitor C2 from signal line 8/a, via diode D2, in addition to flowing into capacitor C2 via charging resistor R1 and charging diode D1 from the emitter of transistor T2. However, when the proper signals are present on both lines 3/a and 6/a, the conduction of current by transistor T2 will be so small that the sum of the two charging currents for capacitor C2 will be insufficient to effect a build-up of capacitor charge such as would result in a capacitor voltage drop which could forward-bias the base-emitter junction of T3 into conduction.

With transistor T3 therefore non-conductive, it is evident that transistor T4 will be highly conductive, and the collector-emitter voltage of transistor T4 will be low. As a consequence, the voltage drop across the winding of the illustrated relay j will be insufficient to energize the winding to an extent activating the relay.

It should be noted that the signal applied to the base of transistor T1 from signal transmission line 3/a will be a pulsating voltage. Such pulsating characteristic will be due to the cyclical and pulsating component of the pump output and/or the pulsating nature of the output signal generated by the rotary flow meter device 2, if the latter is in the form of some type of permanent magnet generator, for example. Accordingly, the small charging current flowing out of the emitter of T2, through charging resistor R1 and charging diode D1, into capacitor C2, will likewise be a pulsating current, but will be insufficient to charge capacitor C2 to a voltage drop that would forward-bias the base-emitter junction of transistor T3 into conduction, as already explained above. It will be understood that during the time intervals between such pulses, capacitor C2 will tend to discharge through discharge resistor R2 and through the base-emitter junction of transistor T3.

If, now, the signal on line 3/a is removed, without the signals on lines 6/a and 8/a being removed, the following will occur. Transistor T1 will become less conductive, and its collector voltage will rise. Accordingly, transistor T2 will become considerably more conductive, and its emitter current will rise appreciably. Accordingly, the charging current flowing from the emitter of T2 through charging resistor R1 and charging diode D1 and into capacitor C2, will be of a magnitude significantly higher than the magnitude which that current had when the proper signals will present on all three signal lines 3/a, 6/a and 8/a, as described just previously. The charging current component reaching capacitor C2 through R1 and D1, when combined with the charging current component reaching capacitor C2 through diode D2 from line 8/a, will together be sufficient to charge capacitor C2 enough that the voltage across it will forwardbias the base-emitter junction of transistor T3, and T3 will conduct. As a result, the collector voltage of T3 will fall markedly, causing transistor T4 to become much less conductive. As a result, the collector voltage of T4 will increase, and the voltage drop across winding j of the illustrated relay will increase to such an extent that winding j becomes energized sufficiently to activate the relay switch.

Thus, when the flow velocity signal applied to input 3/a is removed, at a time when the input 8/a receives a positive voltage indicative of the existence of fluid flow, the discrepancy between the two signals results in a detectable warning signal, namely the energization of the relay j. To repeat, this warning signal resulted when the flow velocity signal on line 3/a disappeared, without disappearance of the positive voltage on line 8/a indicative of the existence of flow. The contradiction between these two signals is evidence of metering system malfunction, and the generation of a warning signal is warranted.

However, in the event that there really is no flow through the fluid conduit 1, then the signal applied to line 3/a should fall to zero, and the signal applied to line 8/a should likewise fall to zero. There is now no contradiction represented by the loss of both these signals. The flow velocity signal indicated zero flow, and the flow detector 8 removes the signal from line 8/a to indicate actual absence of flow. Therefore, no warning signal should be generated, inasmuch as system malfunction has not occurred.

In fact, no warning signal will be generated. When the positive voltage corresponding to detection of the existence of flow is removed from line 8/a, the component of the charging current for C2 which passes through D2 is likewise removed. The only component of charging current for C2 remaining is that originating from the emitter of T2 and passing through charging resistor R1 and charging diode D1. It is to be noted, however, that the circuit values are so selected that this charging current component, alone, is insufficient to charge capacitor C2 up to a voltage that will render transistor T3 conductive. Accordingly, relay j does not become energized, and no warning signal is generated.

Finally, it is noted that if the voltage on line 3/a falls to a value not actually zero but beneath the minimum value which can be processed by the integrator 4 and-/or the display device 5, then, it is evident that such reduction of the voltage on line 3/a will have an end effect similar to that which results when the voltage on line 3/a falls all the way to zero. Namely, relay j will be energized, providing that the positive voltage on line 8/a, indicative of the existence of flow, has not been removed.

Accordingly, all the functions described with respect to the schematic illustration of FIG. 1 are realized utilizing a single very compact circuit having only four transistors, one capacitor, and several other inexpensive components. This evidently represents a very significant improvement over the practice of providing a plurality of separate monitoring devices, each comprised of circuitry as complicated or more complicated than that shown in FIG. 2, and then trying to suitably interconnect them. Not only is the improvement very marked in economic terms, but the compactness of the arrangement according to the invention is evidently such as to require a minimum of space, even to the extent of permitting incorporation of the entire fault-detecting circuit of FIG. 2 in the housing of the signal processing unit 4, for example.

It will be understood that each of the elements described above, or two or more together, may also find a useful application in other types of circuits and constructions differing from the types described above.

While the invention has been illustrated and described as embodied in a fault-indicating circuit for a flow-metering system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a flow metering system comprised of a fluid conduit, means for establishing a flow of fluid through said conduit, means for generating an electrical flow velocity signal indicative of the velocity of fluid flow through said conduit, means for registering the value of said electrical flow velocity signal over a period of time in order to determine the quantity of fluid passing through said conduit during such period of time, a source of biasing voltage for said means for registering, and means for detecting the existence or non-existence of fluid flow in said conduit, in combination therewith, a fault-indicating circuit including a first transistor, means for applying to the base of said first transistor a voltage corresponding to said electrical flow velocity signal, a second transistor having a base connected to the collector of said first transistor, means for applying to the collectors of said transistors a biasing voltage corresponding to the output voltage of said source of biasing voltage, a third transistor having an emitter connected to the emitter of said first transistor, a parallel RC circuit comprised of the parallel connection of a resistor and a capacitor connected across the base-emitter junction of said third transistor, a first charging circuit branch connected between the emitter of said second transistor and the base of said third transistor and operative for charging said capacitor with current flowing through the collector-emitter path of said second transistor, means including a second charging circuit branch connected to the base of said third transistor and connected to said means for determining the existence or non-existence of fluid flow and operative for charging said capacitor with current by applying to the input of said second charging circuit branch a predetermined voltage when said means for detecting the existence or nonexistence of fluid flow in said conduit detects the existence of fluid flow in said conduit, and warning means comprising a fourth transistor having a base-emitter junction connected across the collector-emitter path of said third transistor, an indicating lamp connected between the collectors of said second and fourth transistors, means connecting the base of said fourth transistor to the collector of said second transistor, and a relay connected across the collector-emitter path of said fourth transistor.

2. The system defined in claim 1, wherein said first charging circuit branch comprises the series connection of a charging resistor and a charging diode, and wherein said second charging circuit branch comprises a charging diode.

3. The system defined in claim 2, wherein said means connecting the base of said fourth transistor to the collector of said second transistor comprises a resistor.

* * * * *